May 2, 1933.  W. WEILER  1,906,681
METHOD OF AND APPARATUS FOR INJECTING REGULATING VOLTAGES
Filed Feb. 28, 1931
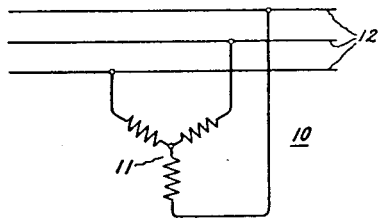
Fig. 1.
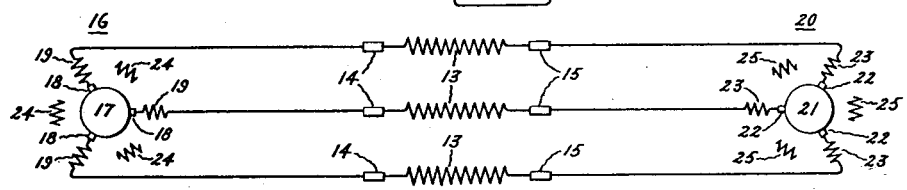
Fig. 2.
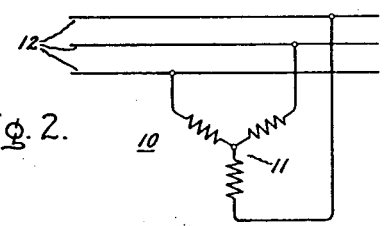
Fig. 3.
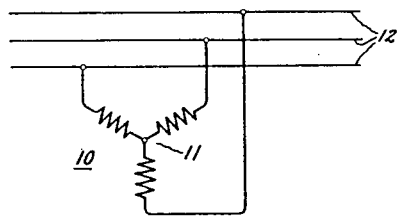
Fig. 4.
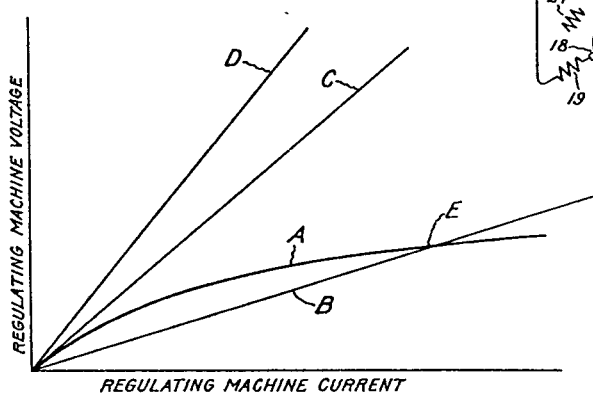
Inventor:
Wilhelm Weiler,
by Charles E. Tullar
His Attorney Patented May 2, 1933

1,906,681

UNITED STATES PATENT OFFICE

WILHELM WEILER, OF BERLIN-NIEDERSCHONHAUSEN, GERMANY, ASSIGNOR TO GENERAL ELECTRIC COMPANY, A CORPORATION OF NEW YORK

METHOD OF AND APPARATUS FOR INJECTING REGULATING VOLTAGES

Application filed February 28, 1931, Serial No. 519,058, and in Germany March 29, 1930.

My invention relates to a method of and an apparatus for injecting regulating voltages into the wound secondary of an induction machine.

The speed, power factor, or both, of an induction motor are often controlled by injecting suitable regulating voltages into the secondary winding of the motor, these voltages being obtained by suitably adjusting the excitation of a regulating machine concatenated with the motor secondary winding. The greater the desired range of regulation of the speed or power factor of the motor, the larger must the regulating machine be to effect the desired regulation. The size of the regulating machine therefore depends on the size of the induction motor and the desired range of regulation to be effected by the regulating machine. When a large range of regulation is to be obtained, especially with a medium or large size induction motor, it becomes desirable to use two or more regulating machines with each induction motor because it is difficult or uneconomical to manufacture a single regulating machine to operate satisfactorily and effect the desired range of regulation.

When the induction motor operates with a relatively high voltage and low current in its secondary winding, it is customary to connect two regulating machines in series with the secondary winding in order to divide the voltage injected into each phase of the secondary winding between the two regulating machines. This arrangement has given very satisfactory operation. It is frequently desirable to design an induction motor for operation with a relatively low voltage and high current in its secondary winding in order to reduce the cost of the motor and reduce the voltage strains in its secondary winding. It has been customary with the last-described type of induction motor to connect two or more regulating machines in parallel with each other to the motor secondary winding in order to divide the current flowing in each phase of the secondary winding among the several regulating machines. The parallel connection of the regulating machines has frequently given unsatisfactory operation because self-excitation of the regulating machines readily occurs when they are connected in parallel, this self-excitation causing one or more of the regulating machines to circulate large currents through the regulating machines, thus causing poor commutation and overheating of the machines and resulting in unsatisfactory operation. I have conceived a method and arrangement of apparatus for injecting regulating voltages into the secondary winding of the motor that permits the current flowing in each phase of the secondary winding to divide among two or more regulating machines without danger of self-excitation of the regulating machines. Briefly described, my invention consists of dividing each phase of the secondary into a plurality of separate windings and respectively connecting the separate windings in every phase in series with different regulating machines.

My invention will, however, be best understood from the following description when considered in connection with the accompanying drawing, while those features of my invention which are believed to be novel and patentable are pointed out in the appended claims.

Fig. 1 represents the prior art method of connecting two regulating machines in series with the secondary winding of an induction machine, and Fig. 2 represents the prior art method of connecting two regulating machines in parallel with the secondary winding of an induction machine, these two figures being illustrated to assist the description of the principles and advantages of my invention; Fig. 3 represents a preferred embodiment of my invention showing two regulating machines connected to the secondary winding of an induction machine; and Fig. 4 represents curves useful in describing the principles underlying my invention. All the figures are represented in diagrammatic form.

In Fig. 1, 10 represents an induction machine having a stationary, three phase, Y-connected primary winding 11 connected to an alternating current source 12 and a rotatable three-phase secondary winding 13 connected to collector rings 14 and 15 as shown. A regulating machine 16 has a rotatable commutated winding 17 on whose commutator rest brushes 18 connected in series with compensated windings 19 to the rings 14. A regulating machine 20 has a rotatable commutated winding 21 on whose commutator rest brushes 22 connected in series with compensating windings 23 to the rings 15. The regulating machines 16 and 20 are also provided with exciting windings 24 and 25 respectively. The means for energizing the exciting windings and for rotating the commutated windings are not shown as such means are well known to those skilled in the art and form no part of my invention. It is obvious that in Fig. 1 the two regulating machines are connected in series with the secondary winding.

It is convenient to describe Figs. 2, 3 and 4 before explaining the operation of the apparatus in any of the figures. In Fig. 2, similar parts to those in Fig. 1 are represented by the same numbers. In Fig. 2, the rings 15 are short-circuited by a lead 26 because the regulating machines 16 and 20 are connected in parallel by leads 27 to the rings 14. If desired the rings 15 and the lead 26 may be omitted by internally connecting the ends of 13 that are connected to rings 15.

In Fig. 3, similar parts to those in Fig. 1 are represented by the same numbers. In Fig. 3, 28 represents a three phase secondary winding with each secondary phase divided into two separate windings. Thus, one phase has windings 29 and 30, a second phase has windings 31 and 32, and the third phase has windings 33 and 34. In this preferred embodiment of my invention, I prefer to describe the windings 29 to 34 inclusive as each adapted when energized to produce the full number of magnetic poles of the secondary winding 28. The ends of the windings 29 to 34 inclusive are represented by 35 to 46 inclusive as shown. The ends 35 and 36 are connected to a collector ring 47. The ends 37 and 38 are connected to a collector ring 48. The ends 39 and 40 are connected to a collector ring 49. The rings 47, 48 and 49 are short-circuited by a lead 50. The ends 41 to 46 inclusive are respectively connected to collector rings 51 to 56 inclusive. The brushes of the regulating machine 16 are connected to rings 51, 53 and 55. The brushes of the regulating machine 20 are connected to rings 52, 54 and 56.

In Fig. 4 the ordinate and abscissa respectively represent the voltage and load current of the regulating machines 16 and 20, the actual values of voltage and current not being represented as they are immaterial to the description of my invention. It is assumed for the sake of simplicity that the machines 16 and 20 have the same characteristics and hence one set of curves will represent the characteristics of both machines. Curve A represents the self-excitation voltage which either of the regulating machines may produce when conditions are favorable for self-excitation. The straight lines B, C and D respectively represent the volts impedance drop of the circuit of a regulating machine with variation in current under three different methods of connecting the two regulating machines to the motor secondary winding. The lines B, C and D therefore correspond to three different values of the circuit impedance in ohms of a regulating machine with the three different methods of connecting the two regulating machines to the motor secondary winding.

Assume for example that in the regulating machine 20 the magnetic axes of the compensating windings 23 and the commutated winding 21 do not substantially coincide with each other. It is well known to those skilled in the art that this produces a tendency in the machine 20 to build up a self-excitation voltage in addition to the normal voltage due to the exciting windings 25. This tendency actually results in the building up of a self-excitation voltage when the circuit impedance of the machine 20 has a sufficiently low value in a manner similar to a direct current series generator building up its voltage when the resistance of its external circuit has a sufficiently low value. When the regulating machines are connected in parallel with each other, as shown in Fig. 2, the circuit impedance of the machine 20, for example, consists of its own impedance in parallel with that of the secondary winding 13 and that of the compensating and commutated windings of the machine 16. The impedance of the compensating and commutated windings of a regulating machine are usually very much lower than that of the motor secondary winding and are usually of such a low value that the resulting circuit impedance of machine 20 will correspond to a line which intersects the curve A, as for example the line B in Fig. 4. It is well known to those skilled in the art that when the circuit impedance line of a regulating machine intersects its self-excitation voltage curve, the machine will build up a self-excitation voltage to the value corresponding to the point of intersection of the two curves when the causes of self-excitation are present. Machine 20 will therefore build up a self-excitation voltage corresponding to the point E in Fig. 4. This self-excitation voltage is superimposed on the normal voltage of machine 20 due to its exciting windings 25 and causes large circulating currents between the regulating machines with resulting poor commutation, overheating and general unsatisfactory operation of the apparatus. It was therefore often necessary with the arrangement shown in Fig. 2 to insert resistances in series with leads 27 in order to artificially increase the circuit impedance of the regulating machines to prevent self-excitation. The insertion of resistances was objectionable because they consumed power and lowered the efficiency of the apparatus, and it was undesirable to insert reactances because they lowered the power factor of the apparatus.

Assume that the impedances of the regulating machines and motor secondary winding in Fig. 1 are the same as those in Fig. 2. The circuit impedance of each regulating machine in Fig. 1 will consist of the secondary winding in series with the compensating and commutated windings of both regulating machines and will therefore correspond to a line which is much higher than the line B in Fig. 4, and may therefore correspond for example to the line D in Fig. 4. Self-excitation of the regulating machines in Fig. 1 cannot occur because the circuit impedance line D does not intersect the curve A.

My novel arrangement of regulating machines, as shown in Fig. 3, gives the advantage of the series-connected arrangement of Fig. 1 to prevent self-excitation of the regulating machines plus the advantage of permitting the current in each phase of the secondary winding to divide between the two regulating machines as occurs in Fig. 2. In Fig. 3, I have divided each secondary phase into two separate windings and connected the separate windings into two groups, each group containing one winding from each phase of the motor secondary. Thus, one group consists of windings 29, 31 and 33 having one end of each winding connected together through rings 47, 48 and 49 and lead 50 and the remaining ends of each winding connected to the brushes 18 of the regulating machine 16 through collector rings 51, 53 and 55. The other group consists of windings 30, 32 and 34 having one end of each winding connected through rings 47, 48 and 49 and lead 50 and the remaining ends of each winding connected to the brushes 22 of regulating machine 20 through collector rings 52, 54 and 56. Each regulating machine is therefore in series with only its group of windings and its circuit impedance consists of its own impedance in series with that of its group of windings. Assuming that the impedances of the regulating machines and motor secondary winding in Fig. 3 are the same as in Figs. 1 and 2, the circuit impedance of each regulating machine in Fig. 3 will be much higher than that of Fig. 2 and slightly lower than that of Fig. 1, and may therefore correspond for example to the line C in Fig. 4. Self-excitation of the regulating machines in Fig. 3 can not occur because the circuit impedance line C does not intersect the curve A. The current however in each phase of the secondary winding in Fig. 3 divides between the two regulating machines, because as seen for example from the phase consisting of the windings 29 and 30, the current in the winding 29 flows only through the regulating machine 16, whereas the current in winding 30 flows only through regulating machine 20.

When it is known in advance that the secondary winding will be connected with its regulating machines as illustrated in Fig. 3, then it may be desirable to omit the collector rings 47, 48 and 49 and connect the ends 35 to 40 inclusive inside the secondary. If desired, the ends 35, 37 and 39 may be connected as one set and the ends 36, 38 and 40 connected as a separate set, with the two sets of ends not connected. It is obvious that in each of the above cases the regulating machine 16 will be connected in series with only its group of windings, namely, 29, 31 and 33, and the regulating machine 20 will be connected in series with only its group of windings, namely 30, 32 and 34. The operation will therefore be the same as previously described in connection with Fig. 3. I have preferred to describe my invention with two separate windings in each phase of the motor secondary and with each separate winding adapted to produce the full number of magnetic poles of the secondary, but I wish it understood that my invention will be equally applicable where each separate winding is adapted to produce less than the full number of magnetic poles of the secondary. Thus, for example in Fig. 3, the winding 29 may be adapted to produce half the number of poles in the motor secondary and the winding 30 may be adapted to produce the remaining half of the number of poles in the secondary. For the sake of clearness, I have described my invention by illustrating the simple method of dividing each secondary phase into two separate windings, connecting the separate windings into two groups and respectively connecting two separate regulating machines in series with the respective groups. It is obvious that when my method of injecting regulating voltages becomes known to those skilled in the art, there may be numerous modifications of my invention used because of the numerous forms of secondary windings employed in induction machines. I therefore wish it understood that my invention will be equally applicable where each secondary phase is divided into more than two separate windings and with the separate windings connected into two or more groups employing two or more regulating machines. I also wish it clearly understood that by the term "separate winding"

I mean not only a single winding, as shown for example by the winding 29 in Fig. 3, but by that term I also mean to include two or more windings arranged in any desired manner to have their currents flow through only one regulating machine.

In accordance with the provisions of the patent statutes I have described the principles of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In combination, an induction machine having a secondary winding consisting of a plurality of separate windings for each phase thereof, a separate regulating machine for each of said separate windings, and means for connecting each separate winding in series with only its regulating machine.

2. In combination, a polyphase wound secondary induction machine having a plurality of separate windings in each phase of the wound secondary, means for connecting said windings to form a plurality of groups, each containing at least one winding from each phase of the wound secondary, a separate regulating machine for each of said groups, and means for connecting the windings in each group in series with only its regulating machine.

3. In combination, a polyphase wound secondary induction machine having a plurality of separate windings in each phase of the wound secondary, means for arranging said windings to form a plurality of groups, each containing at least one corresponding separate winding from each phase of the wound secondary, said means comprising means for connecting together one end of at least one corresponding separate winding from each phase of the wound secondary to form each of said groups, a separate regulating machine for each of said groups, and means for connecting the remaining ends of the separate windings in each group only to its regulating machine.

4. In combination, a polyphase wound secondary induction machine having a plurality of separate windings in each phase of the wound secondary, means for connecting together one end of each of said windings, a plurality of regulating machines, and means for connecting each regulating machine to the remaining end of at least one separate winding in each phase of the wound secondary with only one regulating machine connected to any one remaining end.

5. In combination, a polyphase wound secondary induction machine having two separate windings in each phase of the wound secondary, two regulating machines, means for connecting together one end of each of said windings, means for connecting the remaining end of one corresponding separate winding in each phase of the wound secondary to only one of said regulating machines, and means for connecting the remaining end of the other corresponding separate winding in each phase of the wound secondary to only the other of said regulating machines.

6. In combination, a wound secondary induction motor having a plurality of separate windings in each phase of the wound secondary, a plurality of regulating machines, and means for connecting said separate windings and said regulating machines into a plurality of separate circuits, each circuit consisting of a part of the separate windings in each secondary phase connected in series with only one regulating machine.

7. The method of regulating a wound secondary induction motor having a plurality of separate windings in each phase of the wound secondary, said method including the step of impressing a regulating voltage on at least one of the separate windings in each secondary phase and impressing another regulating voltage on at least another of the separate windings in each secondary phase.

In witness whereof I have hereunto set my hand this 7th day of February 1931.

WILH. WEILER.